Feb. 5, 1924.
E. C. STILLGER
1,482,714
AUTOMOBILE CIRCUIT TESTER
Filed Oct. 3, 1922
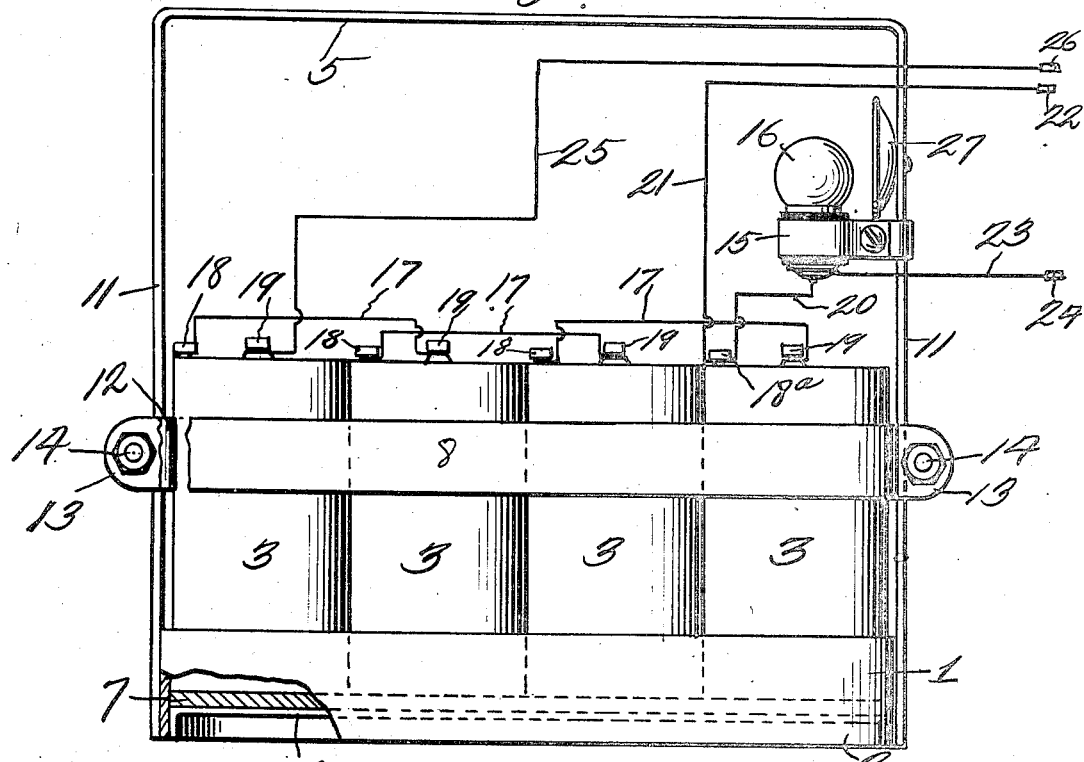
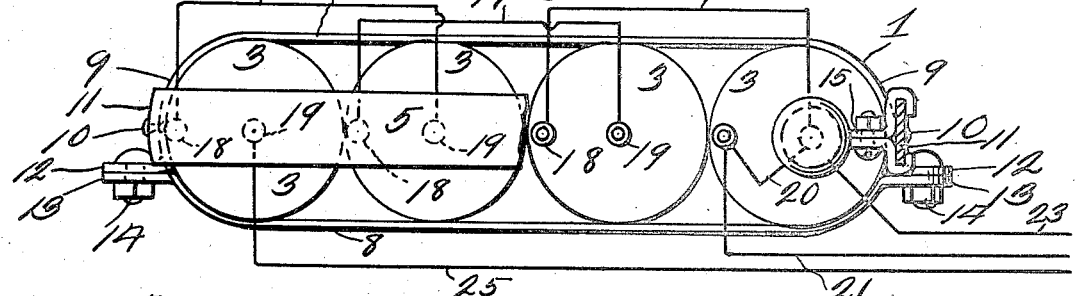
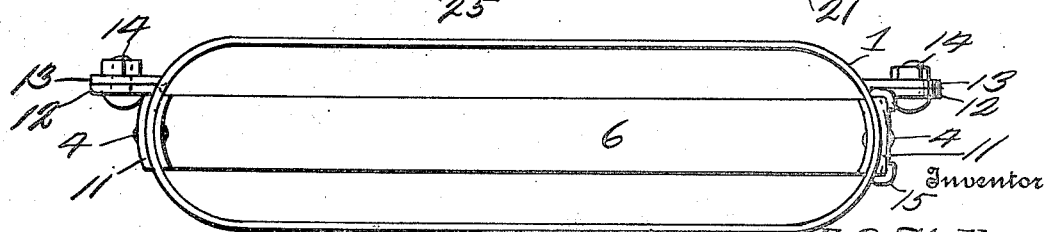
Inventor
E. C. Stillger
By D. Swift
Attorney Patented Feb. 5, 1924.

1,482,714

UNITED STATES PATENT OFFICE.

EDWARD C. STILLGER, OF BURLINGTON, COLORADO.

AUTOMOBILE CIRCUIT TESTER.

Application filed October 3, 1922. Serial No. 592,080.

*To all whom it may concern:*

Be it known that I, EDWARD C. STILLGER, a citizen of the United States, residing at Burlington, in the county of Kit Carson, State of Colorado, have invented a new and useful Automobile Circuit Tester; and I do hereby declare the following to be a full, clear, and exact description of the invention, such as will enable others skilled in the art to which it appertains to make and use the same.

The invention relates to automobile circuit testers and has for its object to provide a device of this character comprising a portable frame having a plurality of batteries therein, in series with each other, said frame being provided with an upwardly extending handle member adapted to be grasped by the operator for moving the tester from place to place. One of the end batteries has its negative post in circuit with an electric lamp supported in a bracket on one side of the handle, said lamp having a test wire attached thereto. A second test wire connected to the negative post, and when used in combination with the lamp test wire, the testing device may be used to test ignition coils, bulbs, etc., and may also be used as a straight battery in case of trouble with the ignition system.

A further object is to provide a test wire connected to the positive post of one of the batteries and when used in combination with a lamp test wire forms means for testing for grounds, testing fuses, locating broken wires and for locating short circuit.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the battery testing device.

Figure 2 is a top plan view of the testing device, part of the handle being broken away to better show the structure.

Figure 3 is a bottom plan view of the battery holder.

Referring to the drawing, the numeral 1 designates the battery holder, which battery holder comprises a horizontally disposed elongated band 2 of substantially the same interior width as the batteries 3. Secured to the ends of the band 2, by means of rivets 4 is a U-shaped handle member 5 which arches over the upper ends of the batteries 3 and is adapted to be grasped by the operator in moving the testing device from place to place. Extending longitudinally across the band 2 adjacent its lower end is a bar 6, on which bar a removable bottom 7 rests, which bottom supports the battery 3, and in conjunction of the sides of the band 6 prevent displacement of the lower ends of the batteries 3. The upper ends of the batteries 3 are held by clamping member which is formed from the U-shaped member 7 and the removable U-shaped member 8. The arms 9 of the U-shaped member 7 are secured at 10 to the inner sides of the vertical arms 11 of the handle member and terminate in outwardly extending ears 12 at the opposite sides of the arms 11. The clamping member 8 is provided with apertured ears 13, which register with the apertured ears 12 and receive bolts 14 whereby the clamping member 8 will be forced into close and binding engagement with the batteries 3, thereby securely holding the batteries within the battery holder. Vertically adjustable on one of the handle arms 11 is a lamp supporting bracket 15, in which is disposed an electric lamp 16. By adjustably mounted in the bracket 15 is it obvious that the lamp may be adjusted upwardly and downwardly for allowing the carrier to receive various heights of batteries according to the voltage desired.

Batteries 3 are connected in series by means of the wires 17, which wires connect the negative posts 18 to the positive posts 19 of the batteries. One of the end batteries has its negative post 18$^a$ connected to the lamp 16 by means of the wire 20 and the negative post 18$^a$ has a second wire 21 attached thereto, which wire is a test wire and provided with a contact member 22. Connected to the electric lamp 16 is a test wire 23, which is provided with a contact member 24. A third test wire 25 is connected to the positive posts 19 of one of the end batteries 3 and is provided with a contact member 26. It will be seen that by using test wires 25 and 21, which are connected to the positive and negative posts of the batteries, said wires can be used to test ignition coils, bulbs, etc., and can also be used as an ignition battery in case of an emergency. By using wires 25 and 23 the current of the batteries goes through the electric lamp 16, and this combination can be used for testing for short circuits, broken wires, fuses, grounds, etc. To locate a ground or short circuit on a single wire ignition system, one wire is held onto the terminal or wiring, while the other wire is held onto the frame of car, and if the bulb does not light there is no short circuit, but if the bulb lights there is a short circuit. By holding or fastening the wires 25 and 23 together the apparatus may be used as a trouble light in case of emergencies, and by providing the arm 11 with a reflector 27 a hand lamp is formed.

To test for a broken wire or an open circuit, wires 25 and 23 are used, one wire is held on one end of the line and the other wire is held on the end and if the lamp 16 lights there is no open circuit, but if the bulb does not light, there must be an open circuit somewhere because the current cannot get through. The same combination may be used to test out switches and other electrical appliances.

From the above it will be seen that a testing device is provided, which is particularly adapted to testing ignition and lighting sytems of automobiles.

The invention having been set forth what is claimed as new and useful is:—

1. A battery tester comprising a frame, a plurality of batteries disposed in said frame, a handle member carried by the frame and arching over the upper ends of the batteries, a vertically adjustable light supporting bracket carried by the handle, oppositely disposed separable U-shaped clamping members for clamping said batteries in the frame, one of said U-shaped members being fixed to handle member.

2. A battery tester comprising an elongated band, a bar connecting the inner sides of the band and extending longitudinally thereof, a bottom disposed on said bar on which batteries rest, a U-shaped handle member extending upwardly from the ends of the band, a U-shaped clamping member spaced from the band and having its arms connected to the U-shaped handle member, outwardly extending apertured ears carried by said clamping member, a U-shaped clamping member cooperating with the first mentioned clamping member and adapted to engage the outer sides of a plurality of batteries, apertured ears carried by the last mentioned clamping member, the apertured ears of both of said clamping members being detachably connected together.

In testimony whereof I have signed my name to this specification in the presence of two subscribing witnesses.

EDWARD C. STILLGER.

Witnesses:
A. P. TONE WILSON, Jr.,
F. J. LEWIS.